Figure 1:
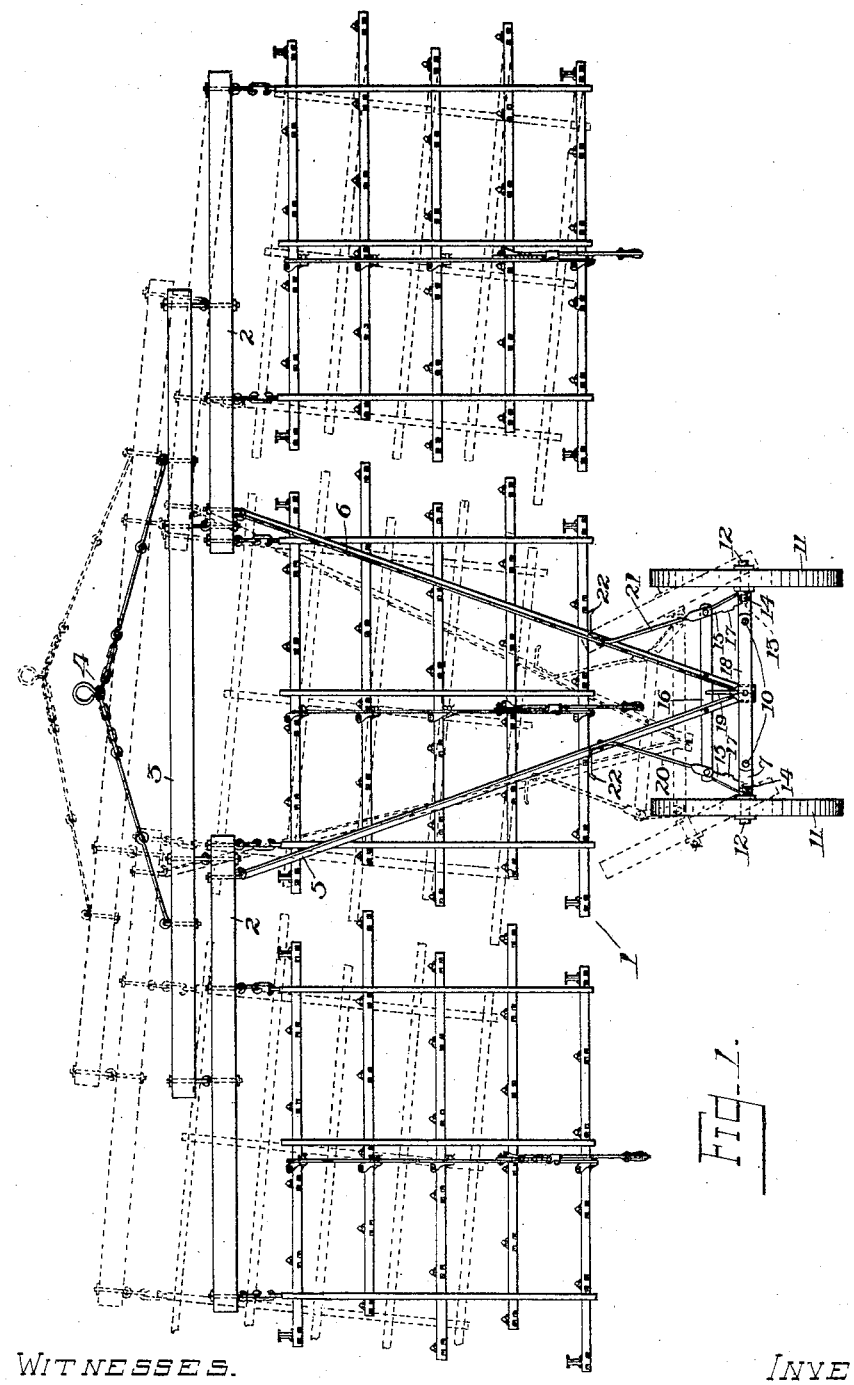

No. 856,305. PATENTED JUNE 11, 1907.
C. S. SHARP.
RIDING ATTACHMENT FOR HARROWS.
APPLICATION FILED FEB. 6, 1907.

2 SHEETS—SHEET 1.

WITNESSES.
INVENTOR
Charles S. Sharp.
By
ATTORNEY.

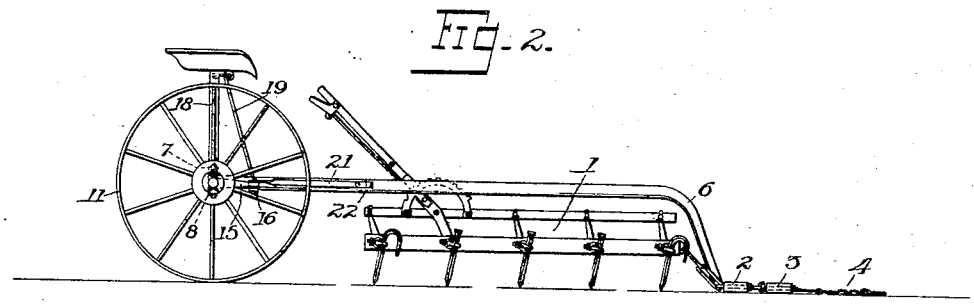

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

RIDING ATTACHMENT FOR HARROWS.

No. 856,305.     Specification of Letters Patent.     Patented June 11, 1907.

Application filed February 6, 1907. Serial No. 355,998.

*To all whom it may concern:*

Be it known that I, CHARLES S. SHARP, a citizen of the United States, residing at Auburn, in the county of Cayuga and State of New York, have invented certain new and useful Improvements in Riding Attachments for Harrows, of which the following is a specification.

My invention relates to riding attachments for harrows of a type designed to be connected to the harrow draft devices and to trail in rear of the harrow, the object being to provide such an attachment that will be automatically guided in proper relation with the direction of movement of the harrow so as to avoid all tendency to cramp or drag the carrying wheels or associated parts.

I attain these objects by the mechanism illustrated in the accompanying drawing, in which—

Figure 1 is a plan view of a harrow having my improved riding attachment connected therewith. Fig. 2 is a side elevation of the riding attachment, and an end view of the harrow. Fig. 3 is a rear view of the attachment. Fig. 4 is a detail of one of the wheel journals showing the manner of connecting it with the draft frame of the attachment; and Fig. 5 is a side elevation of Fig. 4.

Similar reference numerals denote like parts throughout the several views.

1 represents a multiple section harrow having a common form, and 2 designates ordinary draft devices flexibly connected with the harrow sections and which are supplemented by the additional draft member 3 flexibly connected therewith, and to which the draft animals may be attached by means of the draft links 4 in a common way.

The riding attachment to which my invention applies comprises draft bars 5 and 6, having their forward ends flexibly connected with the inner ends of the harrow draft devices 2 and, converging rearward, overhanging the harrow, and their rear ends are slidably supported by the axle of the attachment. The axle comprises upper and lower bars 7 and 8, spaced apart in a vertical plane by means of spacing spools 9 and bolts 10 near opposite ends of the axle.

11 designates the carrying wheels, that are mounted upon journals 12, having vertically arranged sleeve portions 13 adapted to be pivotally received between opposite ends of the bars, and 14 represent pivot bolts securing the sleeves in position and about which the journals may swing, and 15 represent forwardly projecting arms integral with the journals, and pivotally connected with opposite ends of a cross-bar 16, that is rigidly secured to the draft bars 5 and 6 forward of the axle; the pivotal connections of the arms with the cross-bar being nearer together than those of the sleeve portions with the axle, for the purpose of producing a differential movement of the arms and journals when the harrow is being turned about a given point in order to prevent a cramping or dragging action of the wheels. The swinging movement of the arms is limited by means of the shoulder portions 17 coming in contact with the spools 9.

18 represents an arched seat support having its legs secured to the axle by means of the bolts 10, that pass through the spacing spools and bars, and 19 is a link connection between the arch portion of the support and the cross-bar 16 for the purpose of assisting in maintaining the support in a vertical position, and 20 and 21 represent braces having their rear ends secured to the cross-bar 16 at opposite ends thereof, and their forward ends secured to the bars 5 and 6, respectively, and 22 represent outwardly turned portions of the braces adapted to form foot rests for the operator.

What I claim as my invention, and desire to secure by Letters Patent, is:

1. A riding attachment for harrows comprising, in combination, harrow draft devices, an axle, carrying wheels, journals for said wheels pivotally mounted at opposite ends of said axle and provided with forwardly projecting arms, a draft member pivotally connected at its forward end with said harrow draft devices and having its rear end overhanging the harrow and in sliding engagement with said axle, a cross-bar rigidly secured to said draft member forward of said axle and parallel therewith when the harrow and its draft devices and the riding attachment are in normal position, and having the forwardly projecting arms of said wheel journals pivotally connected with opposite ends thereof, the distance between the pivotal axes of the journals with the axle being greater than that of the arms with said cross-bar.

2. A riding attachment for harrows comprising, in combination, harrow draft devices, an axle, carrying wheels, journals for said wheels pivotally mounted at opposite ends of said axle and provided with forwardly projecting arms, a draft member pivotally connected at its forward end with said harrow draft devices and having its rear end overhanging the harrow and in sliding engagement with said axle, a cross-bar rigidly secured to said draft member forward of said axle, said journals having their forwardly projecting arms pivotally connected with opposite ends of said cross-bar, and stops on said axle to limit the swinging movement of the arms.

3. A riding attachment for harrows comprising, in combination, harrow draft devices, an axle and carrying wheels, journals for said wheels pivotally mounted at opposite ends of said axle and provided with forwardly projecting arms, a draft member comprising two rearwardly converging bars having their forward ends pivotally connected with the harrow draft devices and their rear ends overhanging the harrow and slidably connected with said axle, a cross-bar rigidly secured to said bars forward of said axle, said forwardly projecting arms being pivotally connected with opposite ends of said cross-bars, and braces having their rear ends secured to opposite ends of said cross-bars and their forward ends to the converging bars of the draft member.

4. A riding attachment for harrows comprising, in combination, harrow draft devices, an axle and carrying wheels, journals for said wheels pivotally mounted at opposite ends of said axle and provided with forwardly projecting arms, a draft member comprising two rearwardly converging bars having their forward ends pivotally connected with the harrow draft devices and their rear ends overhanging the harrow and slidably connected with said axle, a cross-bar rigidly secured to said converging bars forward of the axle, said forwardly projecting arms being pivotally connected with opposite ends of said cross-bar, braces having their rear ends secured to opposite ends of said cross-bar and their forward ends secured to said converging bars and bent laterally in a manner to form foot rests.

5. A riding attachment for harrows comprising, in combination, harrow draft devices, an axle and carrying wheels, said axle comprising two bars spaced apart in a vertical plane and secured together by spacing and securing means intermediate their ends, journals for said wheels pivotally mounted between opposite ends of said axle bars and having forwardly projecting arms, a draft member pivotally connected at its forward end with said harrow draft devices and having its rear end slidably supported between said axle bars, a cross-bar rigidly secured to said draft member forward of said axle, the forwardly projecting arms of said wheel journals being pivotally connected with opposite ends of said cross-bar, and said spacing and securing means being operative to limit the swing of said wheel journals about their pivotal axes.

6. A riding attachment for harrows comprising, in combination, harrow draft devices, an axle and carrying wheels, said axle comprising two bars spaced apart in a vertical plane and secured together by spacing and securing means intermediate their ends, journals for said wheels pivotally mounted between opposite ends of said bars and having forwardly projecting arms, a draft member having its forward end pivotally connected with said harrow draft devices and its rear end overhanging the harrow and slidably supported between said axle bars, a cross-bar rigidly secured to said draft member forward of said axle, the forwardly projecting arms of said wheel journals being pivotally connected with opposite ends of said cross-bar, an arched seat support having the lower ends of its legs secured to said axle by means of the securing means engaging with said spacing means, and a link connection between the crown of the arch and said cross-bar.

CHARLES S. SHARP.

Witnesses:
ELMER W. STUPP,
CHARLES W. EMBODY.